(12) United States Patent
Haneda

(10) Patent No.: US 9,869,986 B2
(45) Date of Patent: Jan. 16, 2018

(54) DETECTION DEVICE, SENSOR, ELECTRONIC APPARATUS, AND MOVING OBJECT

(71) Applicant: Seiko Epson Corporation, Tokyo (JP)

(72) Inventor: Hideo Haneda, Matsumoto (JP)

(73) Assignee: Seiko Epson Corporation (JP)

( * ) Notice: Subject to any disclaimer, the term of this patent is extended or adjusted under 35 U.S.C. 154(b) by 565 days.

(21) Appl. No.: 14/551,551

(22) Filed: Nov. 24, 2014

(65) Prior Publication Data

US 2015/0149848 A1   May 28, 2015

(30) Foreign Application Priority Data

Nov. 25, 2013 (JP) ................. 2013-242592

(51) Int. Cl.

| | |
|---|---|
| G01D 18/00 | (2006.01) |
| G01D 21/00 | (2006.01) |
| G01P 21/00 | (2006.01) |
| G01R 35/00 | (2006.01) |
| G05B 19/042 | (2006.01) |
| G05B 19/05 | (2006.01) |

(52) U.S. Cl.
CPC ........ *G05B 19/0423* (2013.01); *G05B 19/054* (2013.01); *G05B 2219/25428* (2013.01)

(58) Field of Classification Search
CPC ...... E21B 55/00; E21B 47/02224; E21B 7/06; E21B 7/065; E21B 7/265; E21B 7/04; E21B 44/005; E21B 47/024; E21B 47/06; E21B 2041/0028; E21B 45/00; E21B 47/04; G06F 1/1686; G06F 3/002; G06F 3/01; G06F 3/0202; G06F 3/0219; G06F 3/023; G06F 3/0414; G06F 3/0416; G06F 3/0488; G06F 3/04886; G06F 9/541; G06F 17/00; G06F 19/12; G06F 3/0346; G06F 3/0487; G06F 11/3089; G06F 13/01

See application file for complete search history.

(56) References Cited

U.S. PATENT DOCUMENTS

| | | | | |
|---|---|---|---|---|
| 6,516,021 B1* | 2/2003 | Abbott | .................... | G01S 19/49 342/108 |
| 8,164,514 B1* | 4/2012 | Yang | .................... | G01S 5/0257 342/357.28 |

FOREIGN PATENT DOCUMENTS

| | | |
|---|---|---|
| JP | 62-172217 | 7/1987 |
| JP | 07-019877 | 1/1995 |
| JP | 2004-251671 A | 9/2004 |

* cited by examiner

*Primary Examiner* — Roy Y Yi
(74) *Attorney, Agent, or Firm* — Harness, Dickey & Pierce, P.L.C.

(57) ABSTRACT

A detection device includes: a detection circuit which carries out detection processing of a physical quantity on the basis of a signal from a physical quantity transducer and outputs detected data of the physical quantity; and a correction unit which carries out correction processing on the detected data and outputs the data after the correction processing as output data. The correction unit carries out the correction processing to reduce an integration error generated in the case where the output data is subjected to integration processing, on the detected data of m bits, and outputs the output data of n bits (n and m being natural numbers, holding n<m).

18 Claims, 11 Drawing Sheets

$$PQ = PI + (1-Z^{-1})^2 (Q_1 + Q_2)$$

DETECTION DEVICE, SENSOR, ELECTRONIC APPARATUS, AND MOVING OBJECT

BACKGROUND

1. Technical Field

The present invention relates to a detection device, a sensor, an electronic apparatus, and a moving object or the like.

2. Related Art

In a detection device which detects a physical quantity such as angular velocity or acceleration, in some cases, a processing unit such as a microcomputer that is externally provided may carry out integration processing (adding-up processing) of the detected angular velocity, acceleration or the like, so as to find an angle, velocity, distance or the like.

In such cases, since the detected data of the physical quantity detected by the detection device is data with a finite number of bits, integration processing of the detected data results in an integration error.

For example, JP-A-2004-251671 discloses a technique in which an angular velocity and an angle are measured, then an amount of correction of the angular velocity is determined on the basis of the value of the difference between a calculated value of the angle obtained by integrating the angular velocity and the measured value of the angle, and the angular velocity is corrected using the determined amount of correction, thereby reducing an integration error when finding the angle from the angular velocity.

JP-A-7-18977 discloses a technique in which a gyro sensor is oscillated to enhance resolution, in order to achieve accuracy equal to or higher than output resolution of angular velocity. The technique of JP-A-7-18977 requires a special mechanism to oscillate the gyro sensor.

JP-A-62-172217 discloses a technique which uses an analog circuit integrator, thus enabling highly accurate calculation of angle even in the case where a low-resolution A/D converter circuit is used.

In the case where the resolution of detected data of a physical quantity such as angular velocity outputted from the detection device (physical quantity transducer) is lowered and integration processing is carried out thereon to find an integral value of angle or the like, the related-art techniques carry out integration processing using low-resolution detected data. Therefore, there is a problem of an increased error generated in the integral value of the detected data, due to a discard error generated when the resolution of the detected data of the physical quantity is lowered.

There is also a constraint that a processing unit on the subsequent stage must take in data synchronously with output rate of the data from the detection device.

SUMMARY

An advantage of some aspects of the invention is that a detection device, a sensor, an electronic apparatus and a moving object or the like which can reduce an integration error generated when carrying out integration processing of output data from the detection device, can be provided.

The invention can be implemented as the following embodiments or aspects.

An aspect of the invention relates to a detection device including: a detection circuit which carries out detection processing of a physical quantity on the basis of a signal from a physical quantity transducer and outputs detected data of the physical quantity; and a correction unit which carries out correction processing on the detected data and outputs the data after the correction processing as output data. The correction unit carries out the correction processing to reduce an integration error generated in the case where the output data is subjected to integration processing, on the detected data of m bits, and outputs the output data of n bits (n and m being natural numbers, holding n<m).

According to the aspect of the invention, correction processing to reduce an integration error is carried out on detected data of m bits obtained on the basis of a signal from the physical quantity transducer, and output data of n bits is outputted. That is, correction processing to reduce an integration error generated in the case where the output data is subjected to integration processing is carried out, and the data after the correction processing is outputted as output data of n bits (n<m) with lower resolution than the detected data of m bits. Therefore, for example, when a processing unit or the like on the subsequent stage carries out integration processing of the output data, for example, integration processing with higher accuracy than n bits, which is the resolution of the output data, is possible, and the integration error in an integration result value can be reduced.

In the aspect of the invention, if there is a reading request for the output data, the correction unit may output the data after the correction processing as the output data and may carry out integration processing of an error in the output data with respect to the detected data and hold an integration result value of the integration processing.

According to this configuration, the processing unit or the like on the subsequent stage can read out the output data in response to the reading request, without depending on the output rate of the detection device. Thus, convenience can be improved. Also, in the case, since integration processing of an error in the output data with respect to the detected data is carried out and the integration result value thereof is held, correction processing using the integration result value is possible.

In the aspect of the invention, the correction unit may carry out the correction processing on the output data outputted at the time of a next reading request, on the basis of the integration result value that is held.

According to this configuration, correction processing can be carried out on the output data at the time of the next reading request, using the integration error value that is held, and the output data can be outputted at the time of the next reading request.

In the aspect of the invention, the correction unit may carry out integration processing of an error in the output data with respect to the detected data and carry out the correction processing on the basis of an integration result value of the integration processing.

According to this configuration, the integration result value of the error in the output data with respect to the detected data can be reflected on the output data and the integration error when the output data is subjected to integration processing can be reduced effectively.

In the aspect of the invention, the correction unit may carry out comparison processing between the integration result value and a predetermined value, carry out addition processing of a result value of the comparison processing to the detected data, carry out discard processing of a decimal part of the detected data after the addition processing, and output the output data.

As such discard processing of the decimal part is carried out, the output data of n bits with lower resolution than the detected data of m bits can be outputted. Also, the result value of the comparison processing between the integration result value and the predetermined value is added to the detected data and then the discard processing is carried out. Therefore, the integration error at the time of performing the integration processing of the output data can be reduced more properly than in a technique in which a decimal part is simply discarded.

In the aspect of the invention, the correction unit may carry out addition processing of a value obtained by multiplication processing of the integration result value by predetermined gain, to the detected data, then carry out discard processing of a decimal part of the detected data after the addition processing, and output the output data.

According to this configuration, the value obtained by multiplying the integration result value by the predetermined gain is added to the detected data and then the discard processing is carried out. Therefore, the integration error at the time of performing the integration processing of the output data can be reduced more properly than in a technique in which a decimal part is simply discarded.

In the aspect of the invention, the correction unit may carry out multiplication processing of the integration result value by the gain that is set on the basis of an input rate of the detected data and an output rate of the output data, and carry out addition processing of a value obtained by the multiplication processing, to the detected data.

According to this configuration, even if the input rate of the detected data and the output rate of the output data are different from each other, the integration result value is multiplied by the gain corresponding to these rates. Therefore, the integration result value with a proper error can be added to the detected data.

In the aspect of the invention, in a first mode, the data after the correction processing may be outputted as the output data, and in a second mode, the detected data on which the correction processing is not carried out may be outputted as the output data.

According to this configuration, for example, by setting the first mode when a processing unit or the like on the subsequent stage carries out integration processing of the output data, and setting the second mode when the integration processing is not carried out, it is possible to output the output data by a proper method corresponding to the circumstance.

In the aspect of the invention, the physical quantity transducer may be an oscillator, and the detected data may be angular velocity data.

Another aspect of the invention relates to a sensor including the detection device described above and the physical quantity transducer.

Still another aspect of the invention relates to an electronic apparatus including the detection device described above.

Yet another aspect of the invention relates to a moving object including the detection device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail. The following embodiment should not unduly limit the contents of the invention described in the appended claims. Not all the configurations described in the embodiment are always essential to the solutions of the invention.

1. Detection Device

Figure 1:
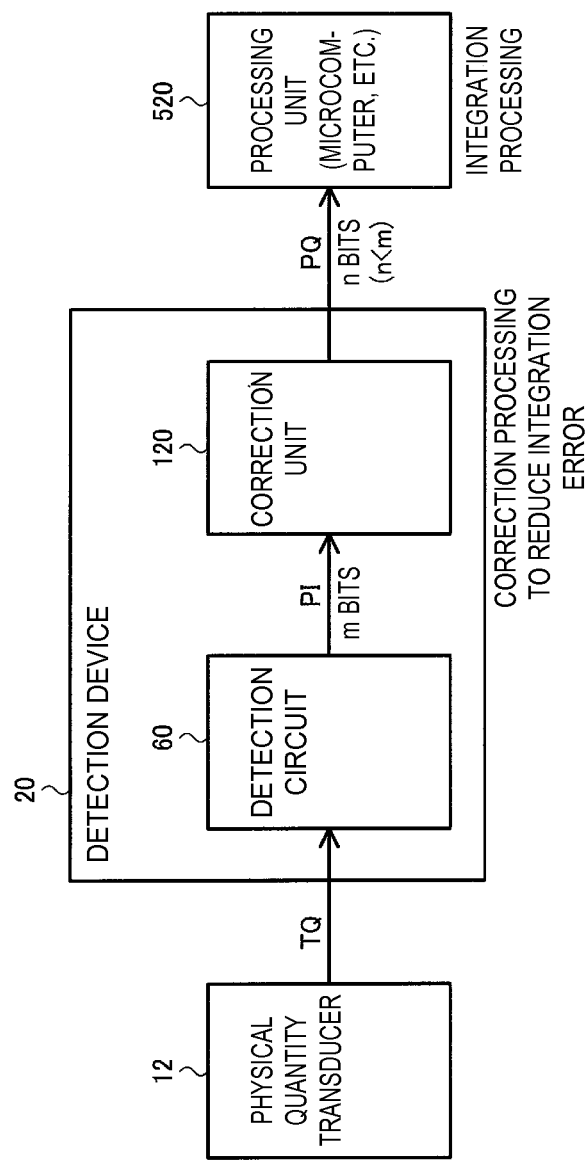
FIG. 1 shows an example of the configuration of a detection device.

FIG. 1 shows an example of the configuration of a detection device 20 according to this embodiment. The detection device 20 has a detection circuit 60 and a correction unit 120.

The detection circuit 60 carries out detection processing of a physical quantity on the basis of a signal TQ from a physical quantity transducer 12. The detection circuit 60 then outputs detected data PI of the physical quantity. The physical quantity transducer 12 is configured to convert a physical quantity, for example, angular velocity, acceleration, angular acceleration, velocity or the like, to an electrical signal (voltage, current). As the physical quantity transducer 12, an oscillator in a gyro sensor, or various devices (sensors) such as an acceleration sensor can be considered. The detection circuit 60 carries out detection processing (synchronous detection or the like) of a physical quantity such as angular velocity, acceleration, angular acceleration, or velocity on the basis of the signal TQ (current signal, voltage signal or the like) from the physical quantity transducer 12, and outputs the detected data PI to the correction unit 120.

The correction unit 120 carries out correction processing on the detected data PI from the detection circuit 60 and outputs the data after the correction processing (data obtained by the correction processing) as output data PQ. In FIG. 1, the output data PQ is outputted to a processing unit 520. The processing unit 520 is an external device of the detection device 20 and can be realized, for example, by a microcomputer, ASIC (application specific integrated circuit) or the like. The correction unit 120 can be realized by a processor such as a DSP or CPU, or a logic circuit such as a gate array.

In this embodiment, the correction unit 120 receives detected data PI (digital data) of m bits. For example, the detection circuit 60 can be configured with an analog circuit which carries out detection processing of a physical quantity such as angular velocity on the basis of a signal TQ from the physical quantity transducer 12, and an A/D converter circuit which carries out digital conversion of an output signal from the analog circuit. The correction unit 120 receives the m-bit detected data PI converted to a digital signal by this A/D converter circuit.

The correction unit 120 carries out correction processing to reduce an integration error in output data PQ, on the detected data PI (physical quantity data). The correction unit 120 then outputs the output data PQ (digital data) of n bits (n and m being natural numbers, holding n<m). For example, the correction unit 120 carries out correction processing to reduce an integration error generated when the output data PQ is subjected to integration processing.

Figure 2A:
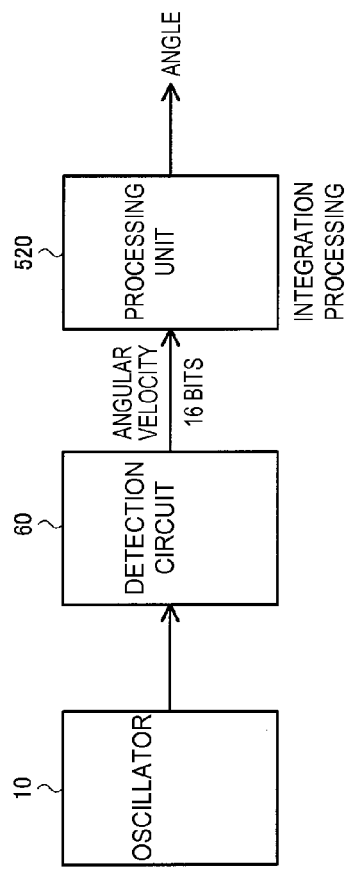
FIGS. 2A and 2B are explanatory views of method in an embodiment.
Figure 2B:
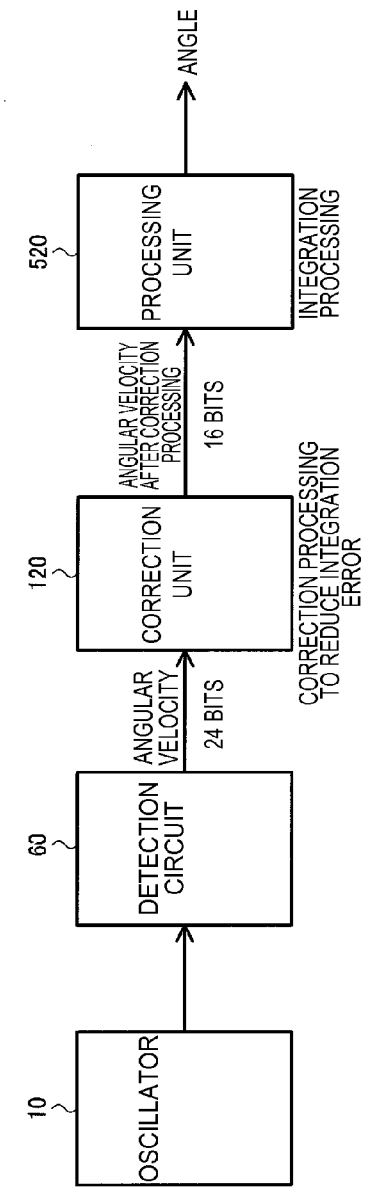

That is, while the external processing unit 520 in some cases uses output data PQ from the detection device 20 as it is, there are cases where the processing unit 520 carries out integration processing of output data PQ and uses the integration result value. For example, in the case where the physical quantity transducer 12 is an oscillator 10 in a gyro sensor as shown in FIG. 2A, the detection circuit 60 carries out detection processing of angular velocity as a physical quantity on the basis of a signal from the oscillator 10 and outputs angular velocity data of, for example, n=16 bits to the processing unit 520. The processing unit 520 carries out integration processing (adding-up processing) of the angular velocity data and thus finds angle data.

However, if integration processing of output data PQ (angular velocity) of a finite number of bits is carried out, an integration error is generated, causing an error in the integration processing result (angle).

In this case, if the detection device 20 outputs data of a large number of bits, the integration error in the integration processing result at the processing unit 520 can be reduced. However, this reduction is limited. Also, since the processing unit 520 is realized by a microcomputer or the like, the number of bits of data that can be processed is limited. For example, in the case where the processing unit 520 in FIG. 2A is a 16-bit microcomputer, the detection circuit 60 discards, for example, lower 8 bits of 24-bit angular velocity data and outputs 16-bit angular velocity data to the processing unit 520. The processing unit 520 carries out integration processing of this 16-bit angular velocity data. Therefore, an error is generated in angle data that is the integration result value.

In FIG. 2A, the external processing unit 520 needs to take in the angular velocity data synchronously with the output rate of the detection circuit 60 (sampling rate of the A/D converter circuit). For example, the angular velocity data needs to be continuously taken in without missing data. Therefore, the processing by the processing unit 520 is occupied by the intake processing of the angular velocity data and consequently the processing efficiency of the processing unit 520 falls, causing a problem with other processing.

Thus, in the embodiment of FIG. 1, correction processing to reduce an integration error generated when the processing unit 520 carries out integration processing of output data PQ is carried out on the side of the detection device 20. For example, the detection circuit 60 outputs detected data PI of m=24 bits. The correction unit 120 carries out the above correction processing to reduce an integration error, on this 24-bit detected data PI. For example, the correction unit 120 carries out this correction processing with an accuracy of 24 bits. The correction unit 120 then outputs the data obtained by the correction processing, for example, as output data PQ of n=16 bits. Specifically, the correction unit 120 handles lower 8 bits of the 24-bit detected data PI after the correction processing as a decimal part, carries out discard processing of the decimal part or the like, and outputs the 16-bit output data PQ.

Then, the processing unit 520 on the subsequent stage carries out integration processing of this 16-bit output data PQ and finds, for example, angle data. At this point, the correction processing to reduce an integration error is already performed on the 16-bit output data PQ. Therefore, a fall in accuracy due to an integration error in the angle data obtained by carrying out integration processing of the angular velocity data as the output data PQ can be prevented. For example, angle data with a similar accuracy to the case where integration processing is carried out with a resolution of 24 bits, can be obtained. Also, since the output data PQ of 16 bits (n bits), instead of 24 bits (m bits), is outputted from the detection device 20, the processing unit 520 can receive and properly process this output data PQ even if the processing unit 520 is, for example, a 16-bit microcomputer.

For example, as a technique in a comparative example of this embodiment, it is conceivable to carry out discard processing of the decimal part of the 24-bit detected data PI and output the 16-bit output data PQ without carrying out correction processing to reduce an integration error. However, in the technique of simply carrying out discard processing alone in this manner, an error or the like generated in the discard processing is accumulated when the processing unit 520 on the subsequent stage carries out integration processing of the output data PQ. Therefore, the accuracy of the integration result value obtained by the integration processing of the output data PQ falls.

In this respect, according to this embodiment, the correction unit 120 performs correction processing to reduce an integration error, for example, with an accuracy of 24 bits, on 24-bit detected data PI, and performs discard processing on the detected data PI after the correction processing, thus outputting 16-bit output data PQ. Therefore, when the processing unit 520 on the subsequent stage carries out integration processing of the output data PQ, accumulation of errors generated in the discard processing is prevented and therefore the accuracy of the integration result value can be improved.

Also, in this embodiment, if there is a reading request for output data PQ, the correction unit 120 outputs the data after the correction processing, as output data PQ, and also carries out integration processing of an error in the output data PQ with respect to the detected data PI and holds the integration result value of the integration processing. That is, instead of taking in output data PQ synchronously with the output rate of the detection device 20 (gyro sensor), the processing unit 520 makes a reading request for output data PQ from the detection device 20. Thus, the output data PQ held in a register (for example, 182 in FIG. 7) of the detection device 20 is outputted to the processing unit 520. Specifically, as the processing unit 520 accesses this register, the output data PQ is taken into the processing unit 520, for example, via a serial interface such as SPI (serial peripheral interface).

At this point, the correction unit 120 carries out integration processing of an error in the output data PQ with respect to the detected data PI and holds the integration result value obtained by the integration processing. Here, the error in the output data PQ with respect to the detected data PI is, for example, the difference value between the detected data PI and the output data PQ. The integration result value is a value obtained by performing integration processing of this error (difference value). The integration result value may be the integral value itself or may be a value equivalent to the integral value (for example, a value obtained by multiplying the integral value by a constant).

The correction unit 120 then carries out correction processing at the time of the next reading request for output data PQ, on the basis of the integration result value (integral value of the error) that is held. For example, using the integration result value held at the time of a first reading request, the correction unit 120 carries out correction processing for a subsequent second reading request. Specifically, the correction unit 120 carries out comparison processing with the integration result value and performs addition processing of the result value of the comparison processing to the detected data PI. For example, if the integration result value is determined as equal to or greater than a predetermined value, addition processing of a first value (for example, "1") as the result value of the comparison processing to the detected data PI is carried out. Meanwhile, if the integration result value is determined as smaller than the predetermined value, addition processing of a second value (for example, "0") as the result value of the comparison processing to the detected data PI is carried out. That is, addition processing of different values to the detected data PI is carried out, depending on whether the integration result value is equal to or greater than the predetermined value, or not. The addition processing may be addition itself or may be processing equivalent to addition.

The correction unit 120 then carries out discard processing of the decimal part of the detected data after the addition processing, and outputs output data PQ. That is, the correction unit 120 outputs the data after the discard processing, as output data PQ.

In this way, in the embodiment, output data PQ is not readout synchronously with the output rate (sampling rate) of the detection device 20, but output data PQ is read out from the detection device 20 under the condition that a reading request is made by the processing unit 520. Therefore, the processing unit 520 can take in output data PQ at a free timing, without being restricted by the output rate of the detection device 20. As a result, the situation where the processing efficiency of the processing unit 520 falls because the processing by the processing unit 520 is occupied by the intake processing of output data PQ, or the like, can be prevented.

As the output data PQ is outputted in response to the reading request, integration processing of the error in the output data PQ with respect to the detected data PI at the time is carried out, and the integration result value is held in the register or the like. Then, on the basis of the integration result value that is held, correction processing on the output data PQ outputted at the time of the next reading request is carried out. Specifically, addition processing of the result value of the comparison processing between the integral result value and the predetermined value, to the detected data PI, is carried out, and discard processing of the decimal part is carried out. Thus, the resulting data is outputted as the output data PQ at the time of the next reading request. Thus, the integration error generated when the processing unit 520 performs integration processing of the output data PQ can be minimized.

It is now assumed, for example, that first output data PQ1 corresponding to first detected data PI1 is taken into the processing unit 520 in response to a first reading request, and that second output data PQ2 corresponding to second detected data PI2 is taken into the processing unit 520 in response to a subsequent second reading request. In this case, integration processing of the error in the first output data PQ1 with respect to the first detected data PI1 is carried out, and the integration result value is held. Then, correction processing on the basis of the integration result value that is held is performed on the second detected data PI2. At the time of the subsequent second reading request, the second output data PQ2 on which this correction processing is performed is outputted. That is, the integration result value of the error up to the previous round (time of the first reading request) is reflected on the second output data PQ2. Thus, when the processing unit 520 performs integration processing using the first and second output data PQ1, PQ2, the error in the integration processing is minimized.

As described above, according to the embodiment, the processing unit 520 can take in the output data PQ at a free timing and can minimize the error when performing integration processing of the output data PQ. If the output data PQ is angular velocity data in a gyro, the processing unit 520 can take in angular velocity data of 16 bits (n bits), which is a smaller number of bits than 24 bits (m bits), from the detection device 20 at a free timing, then perform integration processing of the data, and find angle data with high accuracy. The output data PQ is not limited to angular velocity data and can be various physical quantity data. For example, if the physical quantity transducer 12 is an acceleration sensor, acceleration data is taken into the processing unit 520 as output data PQ, and the processing unit 520 can find velocity data or the like by performing integration processing of the acceleration data.

2. Electronic Apparatus, Gyro Sensor

Figure 3:
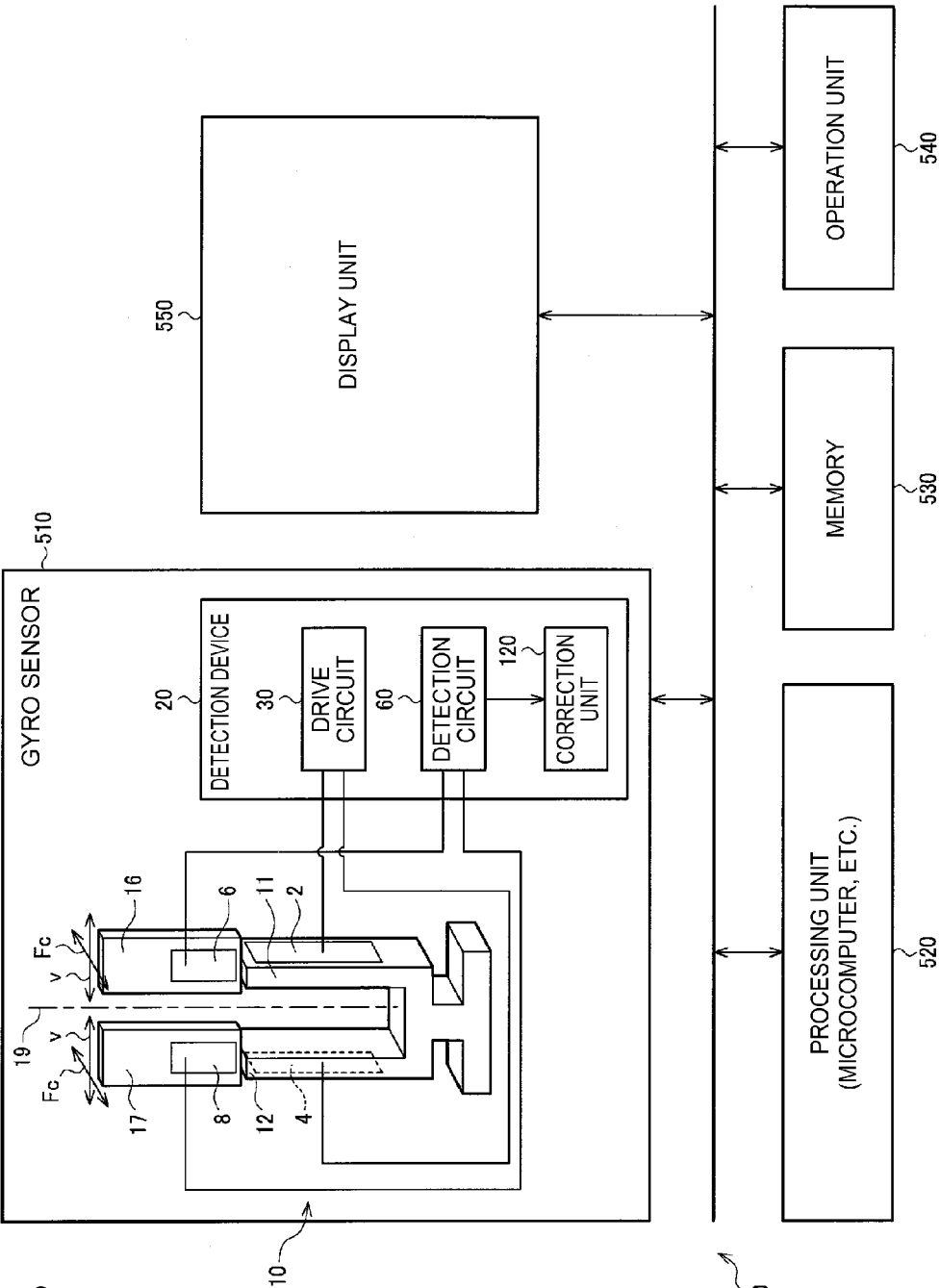
FIG. 3 shows an example of the configuration of an electronic apparatus and a gyro sensor to which the detection device according to the invention is applied.

FIG. 3 shows an example of the configuration of a gyro sensor 510 (in a broad sense, a sensor) including a detection device 20 of this embodiment, and an electronic apparatus 500 including the gyro sensor 510. It should be noted that the electronic apparatus 500 and the gyro sensor 510 are not limited to the configuration of FIG. 3 and can be modified in various manners, such as omitting a part of the components or adding another component. For example, the case where a piezoelectric oscillator (oscillation gyro) is used as a physical quantity transducer and where a gyro sensor is used as a sensor, is described below as an example, but the invention is not limited to this example. The invention can be applied to various physical quantity transducers, for example, an oscillator of an electrostatic capacitance detection system (oscillation gyro) formed with a silicon substrate or the like, and a sensor for detecting a physical quantity equivalent to angular velocity information or other physical quantities than angular velocity information (acceleration sensor). As the electronic apparatus 500 of this embodiment, various apparatuses can be considered such as a digital camera, video camera, mobile phone, car navigation system, robot, game machine, timepiece, health appliance, or mobile information terminal.

The gyro sensor 510 includes an oscillator 10 and the detection device 20. The oscillator 10 of FIG. 3 (in a broad sense, a physical quantity transducer) is a tuning fork-type piezoelectric oscillator formed of a thin plate of a piezoelectric material such as quartz crystal, and includes drive oscillators 11, 12 and detection oscillators 16, 17. Drive terminals 2, 4 are provided on the drive oscillators 11, 12. Detection terminals 6, 8 are provided on the detection oscillators 16, 17.

A drive circuit 30 included in the detection device 20 outputs a drive signal (drive voltage) and thus drives the oscillator 10. The drive circuit 30 then receives a feedback signal from the oscillator 10 and thus excites the oscillator 10. The detection circuit 60 receives a detection signal (detection current, electric charge) from the oscillator 10 driven by the drive signal, and detects (extracts) a desired signal (Coriolis force signal) corresponding to the physical quantity applied to the oscillator 10, from the detection signal.

Specifically, an AC drive signal (drive voltage) from the drive circuit 30 is applied to the drive terminal 2 of the drive oscillator 11. Consequently, a reverse voltage effect causes the drive oscillator 11 to start oscillating, and tuning fork oscillation causes the drive oscillator 12 to start oscillating as well. At this point, a current (electric charge) generated by the piezoelectric effect of the drive oscillator 12 is fed back to the drive circuit 30 as a feedback signal from the drive terminal 4. An oscillation loop including the oscillator 10 is thus formed.

As the drive oscillators 11, 12 oscillate, the detection oscillators 16, 17 oscillate at an oscillation speed v in the direction shown in FIG. 3. Consequently, a current (electric charge) generated by the piezoelectric effect of the detection oscillators 16, 17 is outputted from the detection terminals 6, 8 as detection signals (first and second detection signals). The detection circuit 60 receives the detection signals from the oscillator 10 and detects a desired signal (desired wave) that is a signal corresponding to the Coriolis force. That is, as the oscillator 10 (gyro sensor) rotates about a detection axis 19, a Coriolis force Fc is generated in a direction orthogonal to the oscillating direction of the oscillation speed v. If, for example, the angular velocity when the oscillator 10 rotates about the detection axis 19 is ω, the mass of the oscillator is m, and the oscillation speed of the oscillator is v, the Coriolis force is expressed as Fc=2m×v×ω. Therefore, as the detection circuit 60 detects a desired signal that is a signal corresponding to the Coriolis force, the rotational angular velocity ω of the gyro sensor can be found. Using the angular velocity ω that is found, the processing unit 520 can carry out various kinds of processing for image stabilization, posture control, or GPS autonomous navigation or the like.

Also, the correction unit 120 in the detection device 20 performs correction processing to reduce an integration error, on the angular velocity data, and the processing unit 520 performs integration processing of the angular velocity data after this correction processing. Thus, angle data is found.

While FIG. 3 shows the example in which the oscillator 10 is a tuning fork-type, the oscillator 10 of this embodiment is not limited to such a structure. For example, a T-shape, double-T-shape or the like may also be employed. The piezoelectric material of the oscillator 10 may be other than quartz crystal.

3. Correction Unit

Figure 4:
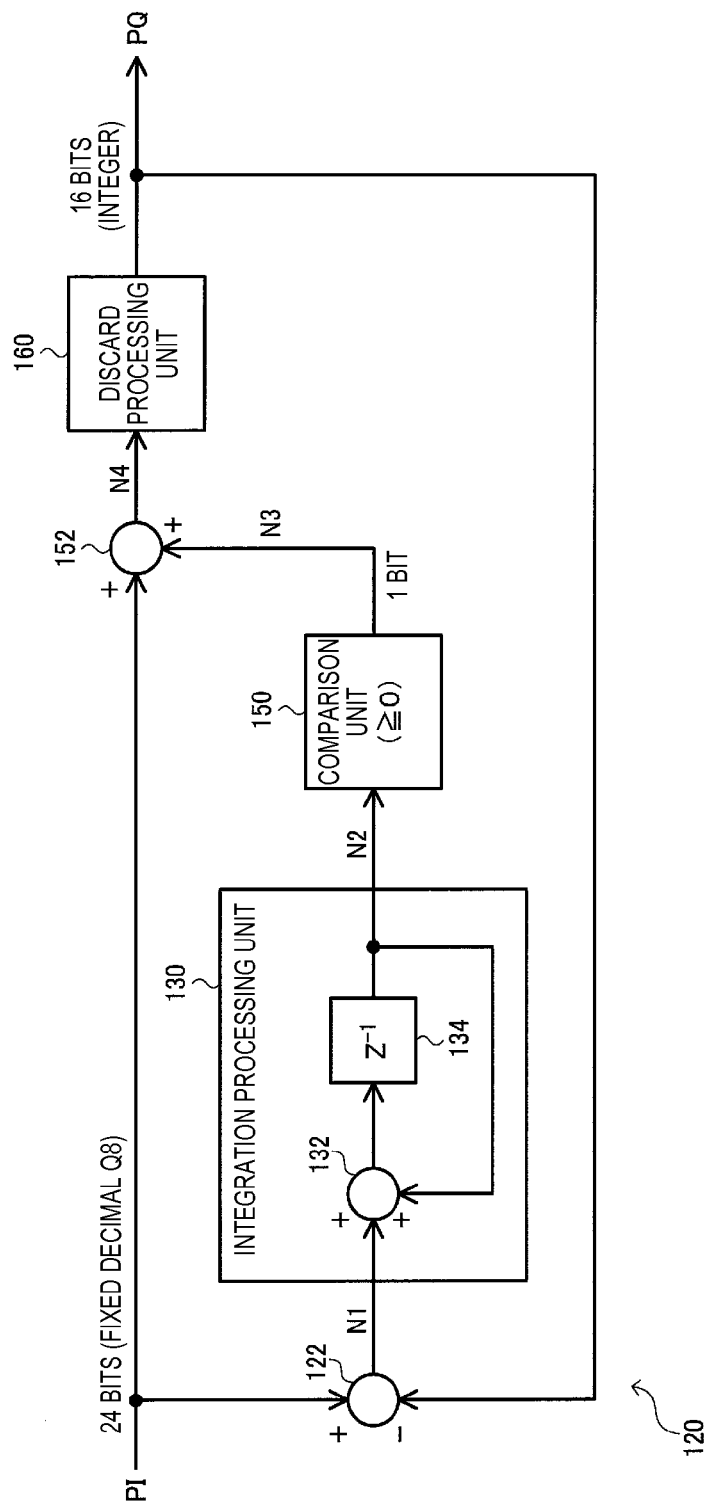
FIG. 4 shows an example of the configuration of a correction unit.

FIG. 4 shows an example of the detailed configuration of the correction unit 120. It should be noted that the correction unit 120 is not limited to the configuration of FIG. 4 and can be modified in various manners such as omitting a part of the components or adding another component.

The correction unit 120 of FIG. 4 carries out integration processing of an error in output data PQ with respect to detected data PI and carries out correction processing based on the integration result value of the integration processing. Specifically, the correction unit 120 carries out comparison processing between the integration result value and a predetermined value, then carries out addition processing of the result value of the comparison processing to the detected data PI, subsequently carries out discard processing of the decimal part of the detected data PI after the addition processing, and outputs the output data PQ. In order to carry out such correction processing, the correction unit 120 of FIG. 4 includes a subtractor 122, an integration processing unit 130, a comparison unit 150, an adder 152, and discard processing unit 160.

The subtractor 122 performs processing to subtract output data PQ from detected data PI and thereby finds an error in the output data PQ with respect to the detected data PI. For example, in FIG. 4, the detected data PI is a 24-bit data in which lower 8 bits form a fixed decimal part, and the output data PQ is 16-bit integer data.

The error as the result of the subtraction processing by the subtractor 122 is inputted to the integration processing unit 130. The integration processing unit 130 includes an adder 132 and a register 134 and performs integration processing of the error in the output data PQ with respect to the detected data PI. The integration result value obtained by the integration processing is held in the register 134.

The integration result value from the integration processing unit 130 is inputted to the comparison unit 150. The comparison unit 150 carries out comparison processing between the integration result value and a predetermined value (for example, 0) and outputs the result value obtained by the comparison processing to the adder 152. For example, if the integration result value is determined as 0 or greater (in a broad sense, equal to or greater than a predetermined value), for example, 1 (in a broad sense, a first value) is outputted as the result value of the comparison processing. Meanwhile, if the integration result value is determined as smaller than 0, for example, 0 (in a broad sense, a second value) is outputted as the result value of the comparison processing.

The adder 152 then carries out addition processing of the result value of the comparison processing to the detected data PI. For example, if the integration result value is 0 or greater, 1 is added to the detected data PI (integer part of PI). If the integration result value is smaller than 0, 0 is added to the detected data PI. In other words, addition processing to the detected data PI is not carried out.

The discard processing unit 160 performs discard processing of the decimal part (8 bits) of the 24-bit detected data PI after the addition processing by the adder 152. Thus, 16-bit integer data is outputted as output data PQ.

According to the correction unit 120 of the configuration shown in FIG. 4, since integration processing (adding up) of an error generated by discard processing is carried out and feedback is given, integration processing of the error with an accuracy of 24 bits is possible even if output data PQ is 16-bit data. Therefore, an integration error generated when the external processing unit 520 performs integration processing of this 16-bit output data PQ can be reduced.

Figure 5:
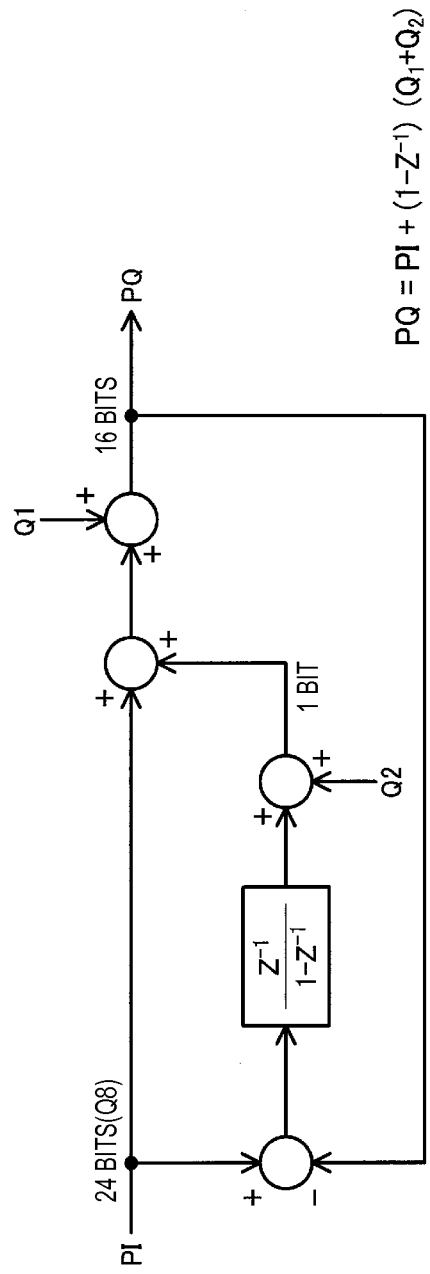
FIG. 5 is an explanatory view of a transfer function of the correction unit.

FIG. 5 is an explanatory view of a transfer function of the correction unit 120 of FIG. 4. The transfer function of the integration processing unit 130 is expressed as $\{Z^{-1}/(1-Z^{-1})\}$. The comparison unit 150 can be configured as a model of a transfer function to add a quantization error Q2. The discard processing unit 160 can be configured as a model for a transfer function to add a quantization error Q1. Therefore, the transfer function of FIG. 5 can be expressed as the following equation (1).

$$PQ=PI+(1-Z^{-1})(Q1+Q2) \quad (1)$$

The equation (1) is equivalent to a transfer function of linear delta-sigma modulation, thus pushing away the quantization error (Q1+Q2) to a high frequency band by the transfer characteristic $(1-Z^{-1})$. While integration processing of the error is carried out with a high resolution of 24 bits, the output data PQ can be outputted with a low resolution of 16 bits. Therefore, when the external processing unit 520 carries out integration processing of the low-resolution 16-bit output data PQ (angular velocity), the integration error in the integration result value (angle) has a higher resolution than 16 bits and therefore the integration error can be reduced.

Figure 6:
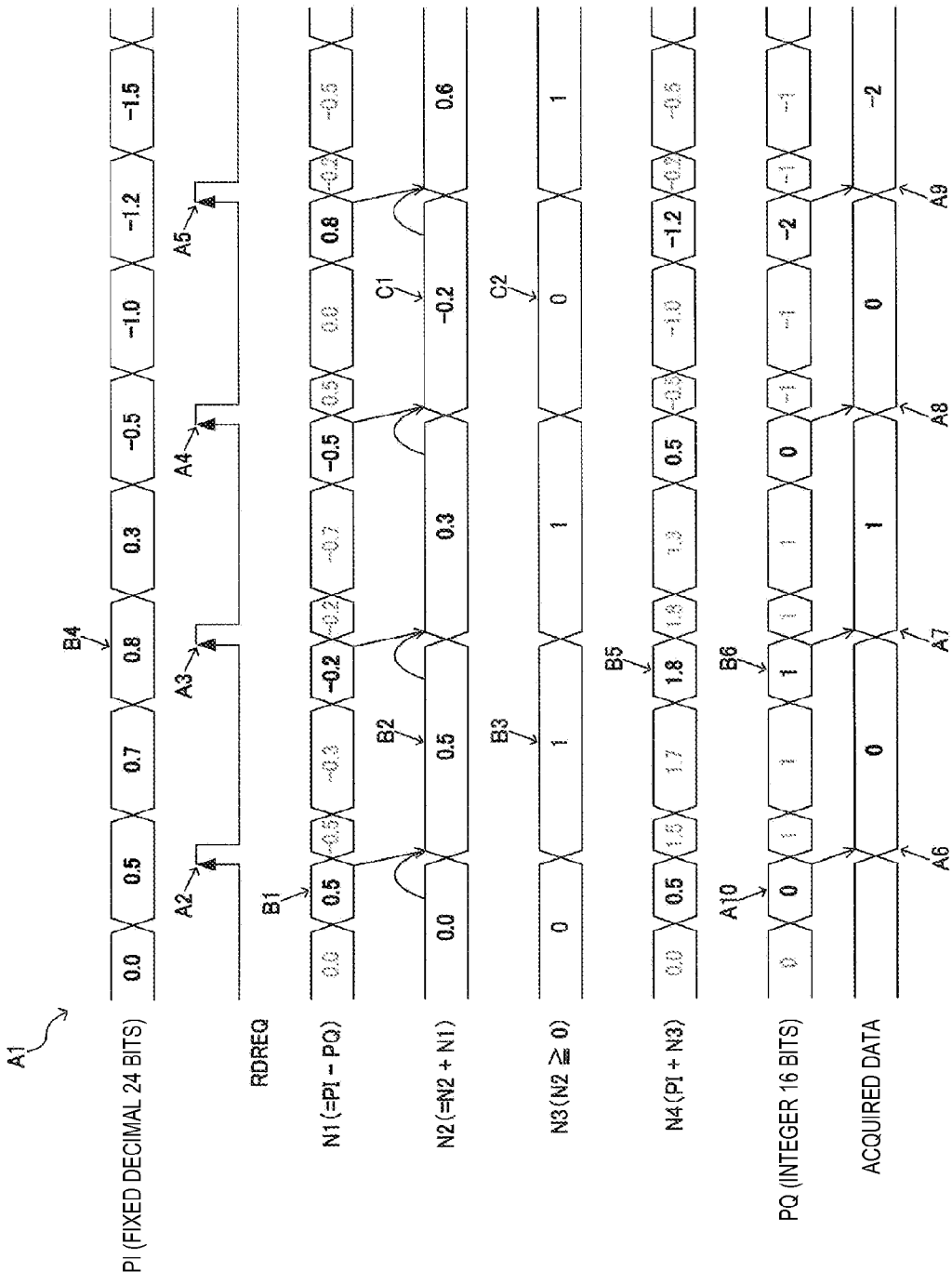
FIG. 6 is an explanatory view of the operation of the correction unit.

FIG. 6 is an explanatory view of the operation of the correction unit 120. In FIG. 6, detected data PI is inputted to the correction unit 120 at an input rate as shown by A1. Meanwhile, output data PQ is outputted to the external processing unit 520 as indicated by A6, A7, A8 and A9 on the basis of reading requests RDREQ indicated by A2, A3, A4 and A5. That is, the processing unit 520 can acquire output data PQ at the timings of A6, A7, A8 and A9.

For example, as a reading request RDREQ is issued at the timing of A2, output data PQ from the discard processing unit 160 at that time as indicated by A10 is acquired by the processing unit 520 as indicated by A6.

Also, as a reading request RDREQ is issued at the timing of A2, the subtractor 122 finds the difference value between detected data PI and output data PQ at that time as an error as indicated by B1, and outputs this error to the integration processing unit 130 (node N1). Then, the integration processing unit 130 performs integration processing of the error and holds the resulting integration result value (N2+N1) in the register 134 as indicated by B2. That is, the integration processing unit 130 adds the error 0.5 from the subtractor 122 to the integration result value up to the previous round 0.0, and holds the integration result value 0.5 in the register 134. The integration result value that is held is outputted to the comparison unit 150 (node N2).

The comparison unit 150 determines whether the integration result value is 0 or greater (equal to or greater than a predetermined value), or not. If the integration result value is 0 or greater, the comparison unit 150 outputs 1 as the comparison result value. If not, the comparison unit 150 outputs 0 as the comparison result value. Since the integration result value at B2 is 0.5, that is, since the integration result value is 0 or greater, the comparison unit 150 outputs 1 as indicated by B3. If the integration result value is a negative value, for example, as indicated by C1, 0 is outputted as the comparison result value as indicated by C2. The comparison result value from the comparison unit 150 is outputted to the adder 152 (node N3).

The adder 152 adds the comparison result value from the comparison unit 150 to the detected data PI, and outputs the detected data PI after the addition processing, to the discard processing unit 160 (node N4). At B3, the comparison result value is 1, and the detected data PI at the time is 0.8 as indicated by B4. Therefore, the adder 152 outputs PI+1=0.8+1=1.8 to the discard processing unit 160 as indicated by B5.

The discard processing unit 160 carries out discard processing of the decimal part of the detected data PI after the addition processing, and outputs the result as output data PQ. Since the detected data PI after the addition processing is 1.8 at B5, the decimal part 0.8 is discarded and 1 is outputted as output data PQ as indicated by B6. This output data PQ=1 is outputted to and acquired by the processing unit 520 as indicated by A7, in response to the next reading request indicated by A3.

As described above, in the embodiment, when a reading request RDREQ for output data PQ is made (A2), data after correction processing is outputted as output data PQ (A6). Also, an error in the output data PQ with respect to the detected data PI is found (B1). Integration processing of the error is carried out and the integration result value is held (B2).

Then, on the basis of the integration result value that is held, correction processing on output data PQ (B6) output-ted at the next reading request (A3) is carried out. Specifically, comparison processing between the integration result value (B2) and 0 (predetermined value) is carried out, and the result value (B3) of the comparison processing is added (B5) to the detected data PI (B4). Then, discard processing of the decimal part of the detected data PI after the addition processing (B5) is carried out (B6), and the data after the discard processing is outputted as output data PQ (A7).

4. First and Second Modes

Figure 7:
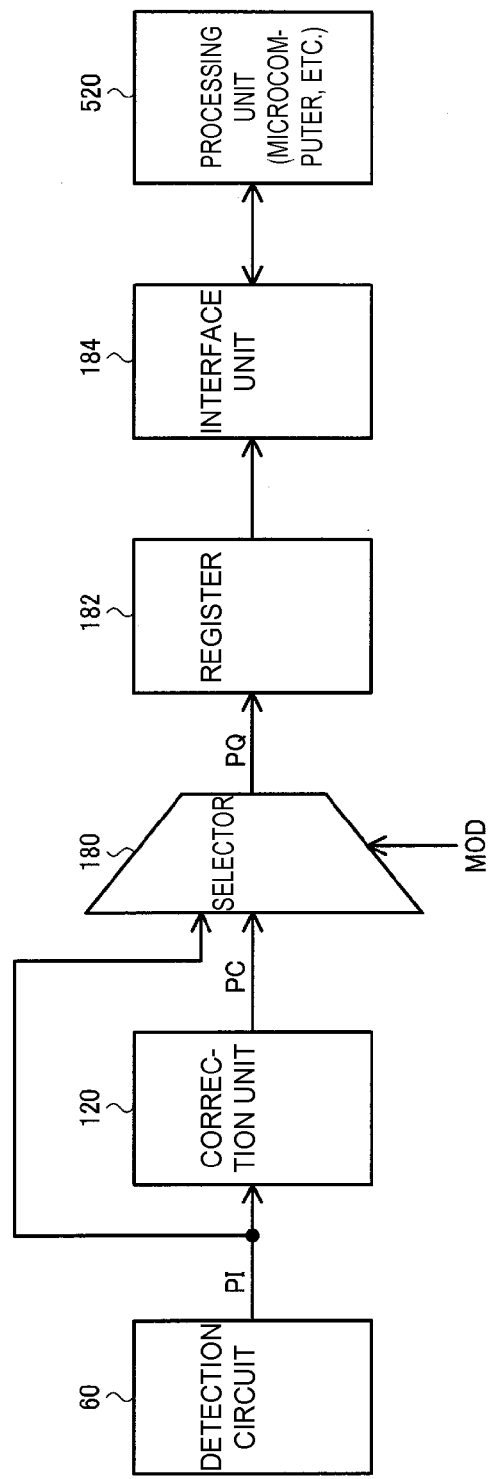
FIG. 7 is an explanatory view of an interface part between the detection device and a processing unit.

FIG. 7 is an explanatory view of an interface part between the detection device 20 and the processing unit 520. In this embodiment, a first mode and a second mode are prepared as output modes for output data PQ. In the first mode, data PC after correction processing is outputted as output data PQ. Meanwhile, in the second mode, detected data PI on which correction processing is not performed is outputted as output data PQ.

For example, in FIG. 7, a selector 180 is provided on the subsequent stage of the correction unit 120. The selector 180 carries out data selection processing on the basis of a mode selection signal MOD. Specifically, if the first mode is selected according to the mode selection signal MOD, the selector 180 selects data PC after correction processing by the correction unit 120, and outputs the selected data as output data PQ. Meanwhile, if the second mode is selected according to the mode selection signal MOD, the selector 180 selects detected data PI on which correction processing by the correction unit 120 is not performed, and outputs the selected data as output data PQ.

The output data PQ is held in a register 182 on the subsequent stage of the selector 180. The processing unit 520 accesses the register 182 via an interface unit 184 and reads out the output data PQ held therein. As the interface unit 184, for example, a serial interface such as SPI can be employed. In this case, the processing unit 520 reads out the output data PQ as serial data on the basis of a clock signal for serial reading.

It is now assumed, for example, that the output data PQ is angular velocity data in a gyro sensor. In the case of performing processing to find angle data from angular velocity data, it is desirable that the processing unit 520 acquires angular velocity data on which correction processing to reduce an integration error is performed, as output data PQ. Therefore, in this case, the first mode is set as the output mode in response to an instruction from the processing unit 520 or the like, and the selector 180 selects data PC after correction processing, and outputs the selected data as output data PQ. Thus, by acquiring angular velocity data on which correction processing to reduce an integration error is performed, and then performing integration processing of the angular velocity data, the processing unit 520 can acquire highly accurate angle data with a reduced integration error.

Meanwhile, there are cases where the processing unit 520 only needs angular velocity data, without performing processing to find angle data from angular velocity data. In such cases, if angular velocity data on which correction processing to reduce an integration error is performed is outputted to the processing unit 520, a fall in performance, malfunctioning or the like may occur in processing the angular velocity data and the result of the processing, due to the unwanted correction processing performed on the angular velocity data. Therefore, in such cases, the second mode is set as the output mode in response to an instruction from the processing unit 520 or the like, and the selector 180 selects detected data PI on which correction processing is not performed, and outputs the selected data as output data PQ.

Thus, the processing unit 520 acquires angular velocity data on which correction processing to reduce an integration error is not performed at all, and can properly execute various kinds of processing using the angular velocity data. That is, the occurrence of problems such as a fall in performance and malfunctioning due to the use of angular velocity data on which unwanted correction processing is performed, can be prevented.

In this way, according to this embodiment, by preparing the first and second modes as output modes, it is possible to realize both a reduction in the integration error generated when output data of the detection device 20 is subjected to integration processing, and prevention of the occurrence of problems due to the use of output data on which unwanted correction processing is performed.

5. Modifications

Figure 8A:
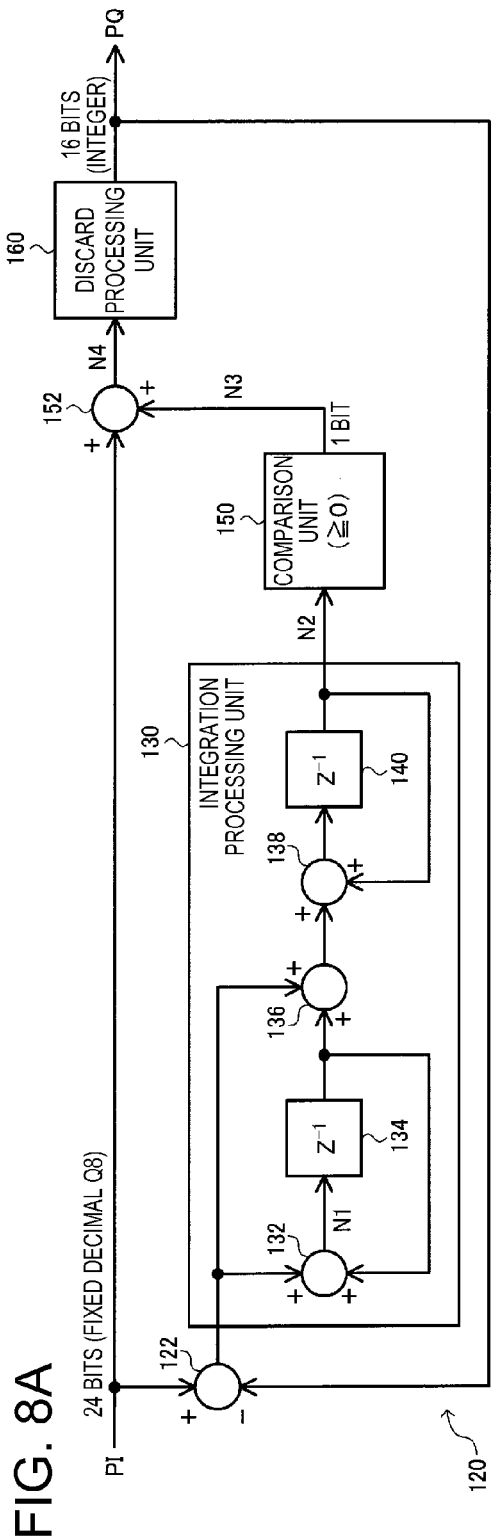
FIGS. 8A and 8B are explanatory views of a first modification of the correction unit and a transfer function thereof.

Next, various modifications of the embodiment will be described. FIG. 8A shows a first modification of the correction unit 120.

In the integration processing unit 130 of FIG. 8A, adders 136, 138 and a register 140 are provided in addition to the adder 132 and the register 134 of FIG. 4. The output from the register 134 is inputted to the adder 136. The adder 136 adds together the output from the register 134 and the output from the subtractor 122. The output from the adder 136 is inputted to the adder 138. The adder 138 adds together the output from the adder 136 and the output from the register 140. The output from the adder 138 is held in the register 140 and the integration result value that is held is outputted to the comparison unit 150.

Figure 8B:
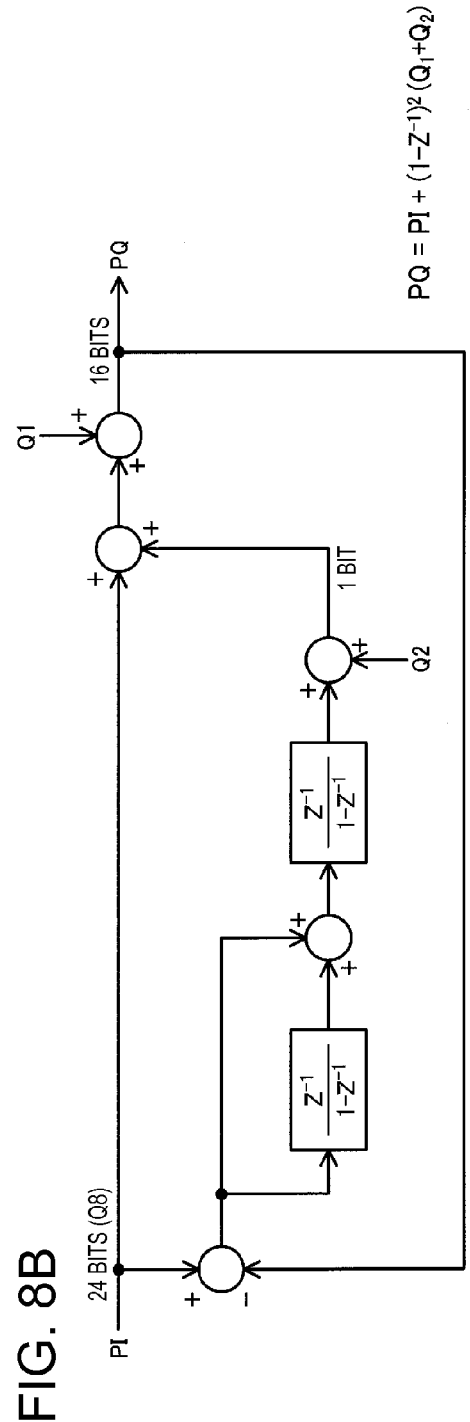

FIG. 8B is an explanatory view of a transfer function of the correction unit 120 according to the first modification of FIG. 8A. The integration processing unit 130 of FIG. 8B is expressed as a transfer function in which integrators are connected in series, expressed by $\{Z^{-1}/(1-Z^{-1})\}$. Therefore, the transfer function of FIG. 8B can be expressed as the following equation (2).

$$PQ=PI+(1-Z^{-1})^2(Q1+Q2) \qquad (2)$$

The equation (2) is equivalent to a transfer function of quadratic delta-sigma modulation, thus pushing away the quantization error (Q1+Q2) to a high frequency band by the transfer characteristic $(1-Z^{-1})^2$.

The configuration of FIG. 8A is more advantageous than that of FIG. 4 in that the degree of pushing away the quantization error to a high frequency band can be increased. Meanwhile, the configuration of FIG. 8A has a problem that harmonic components increase. For example, in the case where integration processing is performed on output data PQ, the harmonic components can be reduced to a certain extent by the integration processing. However, for example, in the case of an application where output data PQ such as angular velocity data is used as it is without being subjected to integration processing, such an increase in harmonic components may lead to problems such as a fall in performance and occurrence of malfunctioning. Therefore, the configuration of FIG. 4 is desirable if avoiding such problems is given priority.

Figure 9:
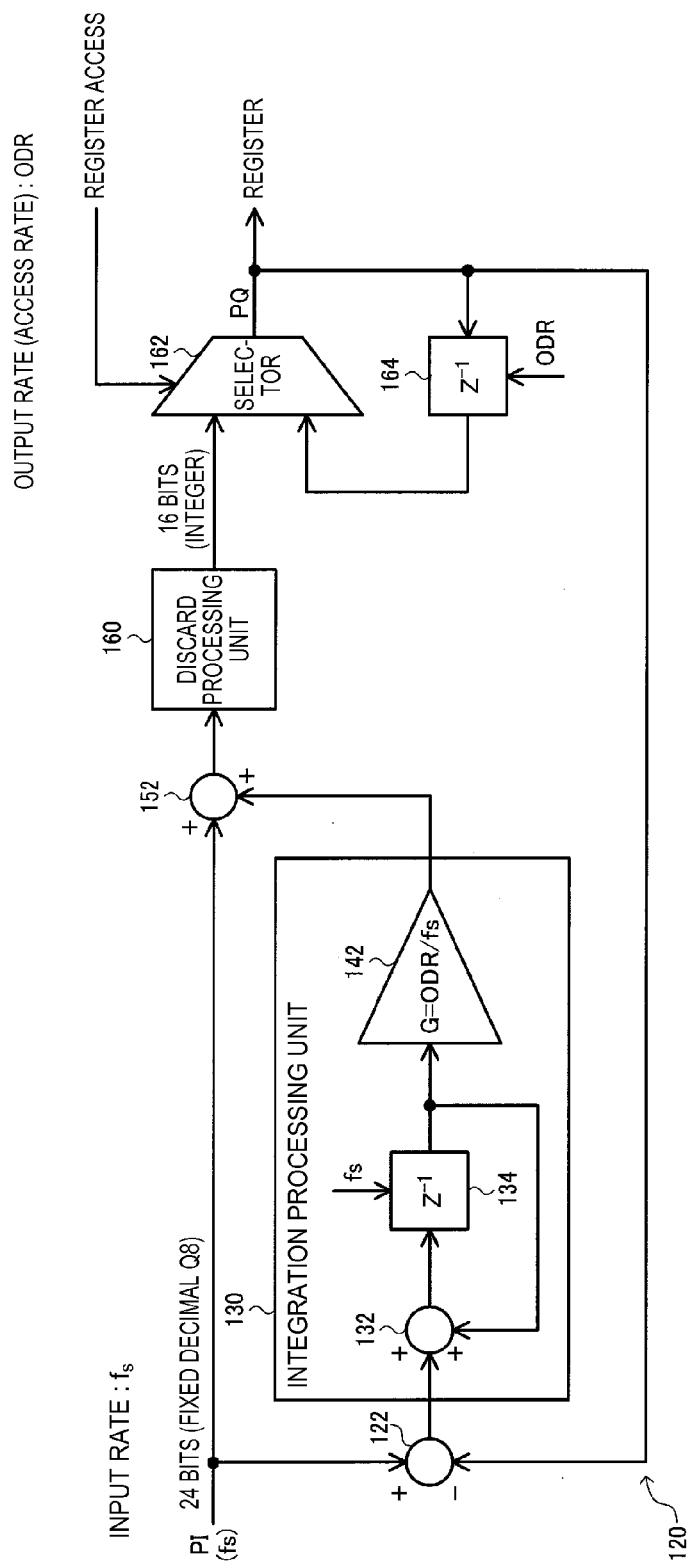
FIG. 9 shows a second modification of the correction unit.

FIG. 9 shows a second modification of the correction unit 120. In FIG. 9, the correction unit 120 carries out addition processing of a value obtained by multiplication processing of the integration result value by a predetermined gain, to detected data PI. Then, the correction unit 120 carries out discard processing of the decimal part of the detected data PI after the addition processing, and outputs output data PQ.

It is now assumed, for example, that the input rate of the detected data PI is fs and that the output rate of the output data PQ (register access rate) is ODR. In this case, the correction unit 120 carries out multiplication processing of the integration result value by a gain G that is set on the basis of the input rate fs and the output rate ODR. The correction unit 120 then carries out addition processing of the value obtained by the multiplication processing, to the detected data PI.

Specifically, the integration processing unit 130 has the adder 132, the register 134, and a multiplier 142. The adder 132 and the register 134 form an integrator. The register 134 takes in and holds the integration result value outputted from the adder 132, at the input rate fs. The multiplier 142 multiplies the integration result value held in the register 134, by the gain G. The gain G is set on the basis of the input rate fs of the detected data PI and the output rate ODR of the output data PQ. The gain G is set, for example, to G=ODR/fs.

The adder 152 carries out processing to add the value provided by the multiplication processing by the multiplier 142, to the detected data PI. The discard processing unit 160 carries out discard processing of the decimal part of the detected data PI after the addition processing, and outputs 16-bit integer data.

When there is a register access at the output rate ODR, the output data from the discard processing unit 160 at that access timing is held in a register 164 via a selector 162. The data held in the register 164 is then outputted as output data PQ to a register or the like on the subsequent stage via the selector 162.

It is now assumed, for example, that the input rate is fs=200 KHz and that the output rate on register access is ODR=100 KHz. In this case, every time register access is made once, the integration processing unit 130 (the integrator formed by the adder 132 and the register 134) carries out integration processing twice. For example, it is assumed that the period between first register access and subsequent second register access is TRG (=1/ODR=1/100 KHz) and that the period between first integration processing and subsequent second integration processing is TIT (=1/fs=1/200 KHz). Then, TIT=TRG/2 holds and the integration processing unit 130 carries out integration processing twice during the period TRG.

Thus, the gain of the multiplier 142 is set to G=ODR/fs=100 KHz/200 KHz=½. Thus, a value obtained by multiplying the integration result value of the error in the output data PQ with respect to the detected data PI by ½ is added to the detected data PI. In this way, even if the input rate fs and the output rate ODR are different from each other, a proper integration result value of the error can be added. Therefore, when the processing unit 520 on the subsequent stage performs integration processing of the output data PQ, an integration result value with a properly reduced integration error can be obtained.

6. Detection Device

Figure 10:
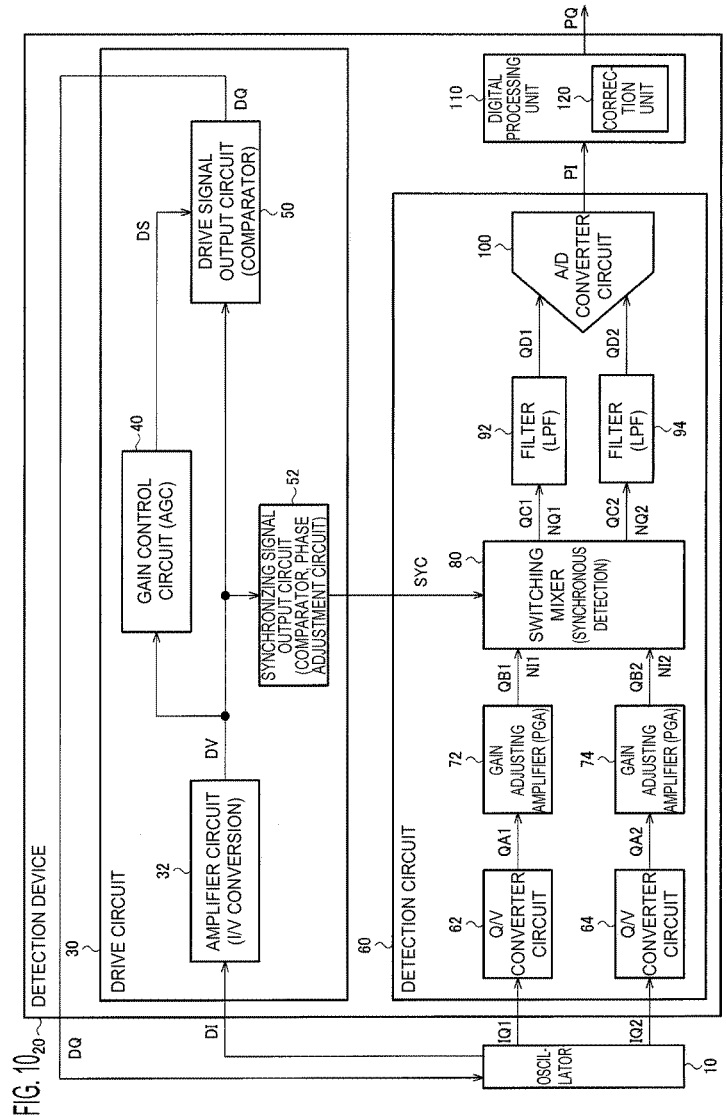
FIG. 10 shows an example of the detailed configuration of the detection device.

FIG. 10 shows an example of the detailed configuration of the detection device 20 of this embodiment. The detection device 20 of FIG. 10 includes the drive circuit 30, which drives the oscillator 10 (physical quantity transducer), the detection circuit 60, which receives first and second detection signals IQ1, IQ2 from the oscillator 10 and performs detection processing to detect a desired signal, and a digital processing unit 110.

The drive circuit 30 includes an amplifier circuit 32 to which a signal DI from the oscillator 10 is inputted, a gain control circuit 40 (AGC: automatic gain control) which performs automatic gain control, a drive signal output circuit 50 which outputs a drive signal DQ to the oscillator 10, and a synchronizing signal output circuit 52 which outputs a synchronizing signal SYC to the detection circuit 60. The configuration of the drive circuit 30 is not limited to FIG. 10 and can be modified in various manners such as omitting a part of the components or adding another component.

The amplifier circuit 32 (I/V converter circuit) converts the current signal DI from the oscillator 10 to a voltage signal DV and outputs the voltage signal DV. The amplifier circuit 32 can be realized with a capacitor, a resistance element, an operational amplifier or the like.

The gain control circuit 40 (AGC) monitors the signal DV and controls the gain of the oscillation loop. Specifically the gain control circuit 40 outputs a control voltage DS for controlling the gain of the oscillation loop, to the drive signal output circuit 50. For example, in the drive circuit 30, the amplitude of the drive voltage supplied to the oscillator 10 (drive oscillator) needs to be kept constant in order to keep the sensitivity of the gyro sensor constant. Therefore, the gain control circuit 40 for automatic adjustment of gain is provided within the oscillation loop in the drive oscillation system. The gain control circuit 40 automatically adjusts gain in a variable manner so that the amplitude of the signal DI fed back from the oscillator 10 (oscillation speed v of the oscillator) becomes constant. At the startup of oscillation, the gain of the oscillation loop is set to gain that is greater than 1 in order to enable high-speed oscillation startup. This gain control circuit 40 can include a full-wave rectifier circuit for converting the AC signal DV from the amplifier circuit 32 to a DC signal, and an integrator which outputs the control voltage DS corresponding to the difference between the voltage of the DC signal from the full-wave rectifier circuit and a reference voltage, or the like.

The drive signal output circuit 50 receives the signal DV from the amplifier circuit 32 and outputs the drive signal DQ to the oscillator 10. Specifically, the drive signal output circuit 50 outputs the drive signal DQ with an amplitude corresponding to the control voltage DS from the gain control circuit 40. For example, the drive signal output circuit 50 outputs a drive signal of a square wave (or sine wave). The drive signal output circuit 50 can be realized with a comparator or the like.

The synchronizing signal output circuit 52 receives the signal DV from the amplifier circuit 32 and outputs the synchronizing signal SYC (reference signal) to the detection circuit 60. The synchronizing signal output circuit 52 can be realized with a comparator which performs binarization processing of the sine-wave (AC) signal DV to generate a square-wave synchronizing signal SYC, a phase adjustment circuit (phase shifter) which performs phase adjustment of the synchronizing signal SYC, or the like.

The detection circuit 60 includes first and second Q/V converter circuits 62, 64, first and second gain adjusting amplifiers 72, 74, a switching mixer 80, first and second filters 92, 94, and an A/D converter circuit 100. The configuration of the detection circuit 60 is not limited to that shown in FIG. 10 and can be modified in various manners such as omitting a part of the components or adding another component.

Differential first and second detection signals IQ1, IQ2 from the oscillator 10 are inputted to the Q/V converter circuits 62, 64 (charge-voltage converter circuit). The Q/V converter circuits 62, 64 convert the electric charge (current) generated by the oscillator 10 to voltage. The Q/V converter circuit 62, 64 are continuous charge-voltage converter circuits having a feedback resistance.

The gain adjusting amplifiers 72, 74 adjust the gain of output signals QA1, QA2 from the Q/V converter circuits 62, 64 and amplify the signals QA1, QA2. The gain adjusting amplifiers 72, 74 are so-called programmable gain amplifiers and amplify the signals QA1, QA2 with the gain that is set by a control unit, not shown. For example, the gain adjusting amplifiers 72, 74 amplify the signals to signals having an amplitude that matches the voltage conversion range of the A/D converter circuit 100.

The switching mixer 80 is a mixer which carries out synchronous detection of the differential on the basis of the synchronizing signal SYC from the drive circuit 30. Specifically, in the switching mixer 80, the output signal QB1 from the gain adjusting amplifier 72 is inputted to a first input node NI1, and the output signal QB2 from the gain adjusting amplifier 74 is inputted to a second input node NI2. Then, synchronous detection of the differential is carried out on the basis of the synchronizing signal SYC from the drive circuit 30, and differential first and second output signals QC1, QC2 are outputted to first and second output nodes NQ1, NQ2. By the switching mixer 80, an unwanted signal such as noise (1/f noise) generated in the preceding circuits (Q/V converter circuits, gain adjusting amplifiers) is frequency-converted to a high frequency band. Also, a desired signal that is a signal corresponding to a Coriolis force is inserted in the DC signal.

The first output signal QC1 from the first output node NQ1 of the switching mixer 80 is inputted to the filter 92. The second output signal QC2 from the second output node NQ2 of the switching mixer 80 is inputted to the filter 94. These filters 92, 94 are, for example, low-pass filters having such a frequency characteristic as to eliminate (attenuate) an unwanted signal and transmit a desired signal. For example, the unwanted signal such as 1/f noise that is frequency-converted to a high frequency band by the switching mixer 80 is eliminated by the filters 92, 94. Also, the filters 92, 94 are passive filters made up of passive elements. That is, as the filters 92, 94, passive filters made up of passive elements such as a resistance element and a capacitor, without using an operational amplifier, can be employed.

The A/D converter circuit 100 receives an output signal QD1 from the filter 92 and an output signal QD2 from the filter 94 and carries out differential A/D conversion. Specifically, the A/D converter circuit 100 samples the output signals QD1, QD2 and carries out A/D conversion, using the filters 92, 94 as anti-aliasing filters (pre-filters). In this embodiment, the output signal QD1 from the filter 92 and the output signal QD2 from the filter 94 are inputted to the A/D converter circuit 100 without passing through any active element.

As the A/D converter circuit 100, A/D converter circuits of various types, for example, delta-sigma type or sequential comparison type, can be employed. If a delta-sigma type is employed, an A/D converter circuit which has, for example, the functions of CDS (correlated double sampling) and chopper in order to reduce 1/f noise and which is made up of, for example, a quadratic delta-sigma modulator or the like can be used. Meanwhile, if a sequential comparison type is employed, an A/D converter circuit which has, for example, the function of DEM (dynamic element matching) or the like to restrain deterioration in S/N ratio due to DAC element variation and which is made up of a capacitive DAC and a sequential comparison control logic can be used.

The digital processing unit 110 carries out various kinds of digital signal processing. For example, the digital processing unit 110 carries out digital filter processing for band limitation corresponding to the application of a desired signal, and digital filter processing to eliminate noise generated by the A/D converter circuit 100 or the like. The digital processing unit 110 also carries out digital correction processing such as gain correction (sensitivity adjustment) and offset correction.

In FIG. 10, the correction unit 120 of this embodiment described with reference to FIG. 1 and the like is provided in the digital processing unit 110. The correction unit 120 performs the correction processing described in the embodiment, on the basis of the detected data PI from the A/D converter circuit 100, and outputs the output data PQ.

The detection device 20 of FIG. 10 employs a fully differential switching mixer system. That is, the differential detection signals IQ1, IQ2 from the oscillator 10 are subjected to signal amplification and gain adjustment by the Q/V converter circuits 62, 64 and the gain adjusting amplifiers 72, 74, and inputted to the switching mixer 80 as the differential signals QB1, QB2. These differential signals QB1, QB2 are subjected to synchronous detection processing by the switching mixer 80 in which the unwanted signal is frequency-converted to a high frequency band. Then, the unwanted signal that is frequency-converted to the high frequency band is eliminated by the filters 92, 94 and the resulting differential signals QD1, QD2 are inputted to the A/D converter circuit 100, where differential A/D conversion is carried out.

According to such a fully differential switching mixer system, the 1/f noise or the like generated in the Q/V converter circuits 62, 64 and the gain adjusting amplifiers 72, 74 is eliminated through the frequency conversion by the switching mixer 80 and by the low-pass filter characteristic of the filters 92, 94. The switching mixer 80, which does not generate gain but generates no 1/f noise, and the filters 92, 94 made up of low-noise passive elements are provided between the gain adjusting amplifiers 72, 74 and the A/D converter circuit 100. Thus, since the noise generated in the Q/V converter circuits 62, 64 and the gain adjusting amplifiers 72, 74 is eliminated and the noise generated in the switching mixer 80 and the filters 92, 94 is minimized, the signals QD1, QD2 in the low-noise state can be inputted to the A/D converter circuit 100 and thus A/D-converted. Moreover, since the signals QD1, QD2 can be A/D-converted as differential signals, the S/N ratio can be improved further, compared with the case where single-ended signals are A/D-converted.

It should be noted that the detection device 20 of this embodiment is not limited to the configuration employing the fully differential switching mixer system as shown in FIG. 10. Various configurations, for example, configurations employing a direct sampling system which includes a discrete Q/V converter circuit and an A/D converter circuit connected directly to the discrete Q/V converter circuit, can be employed.

Figure 11:
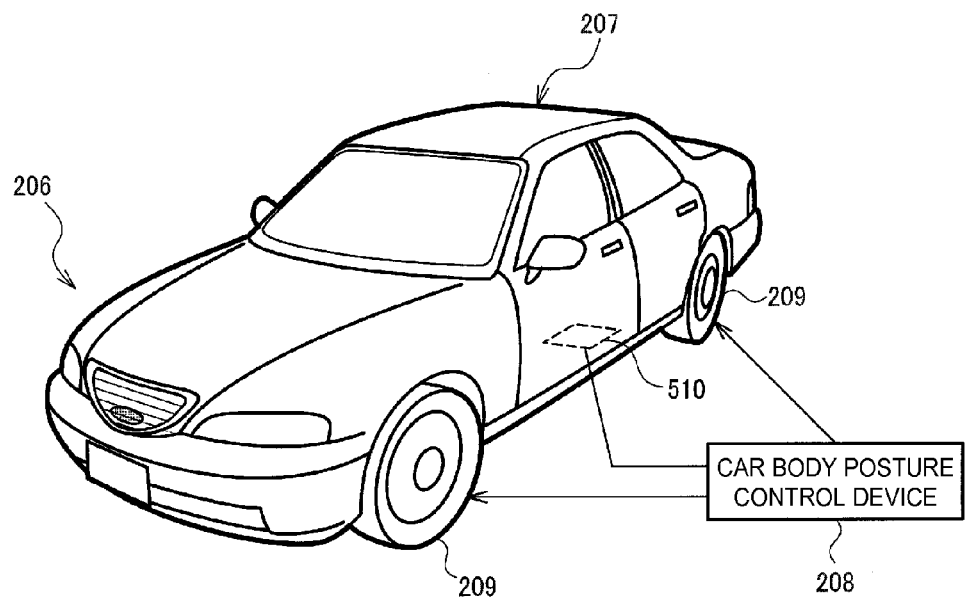
FIG. 11 shows an example of a moving object to which the detection device of the embodiment is applied.

FIG. 11 shows an example of a moving object including the detection device 20 of this embodiment. The detection device 20 of this embodiment can be incorporated in various moving objects, for example, an automobile, aircraft, motorcycle, bicycle, ship or the like. A moving object is a device or apparatus which has, for example, a drive mechanism such as an engine or motor, a steering mechanism such as a steering wheel or steering gear, and various electronic devices, and which moves on the ground, in the air, or at sea. FIG. 11 schematically shows an automobile 206 as a specific example of the moving object. The gyro sensor 510 (sensor) having the oscillator 10 and the detection device 20 is incorporated in the automobile 206. The gyro sensor 510 can detect the posture of a car body 207. A detection signal from the gyro sensor 510 can be supplied to a car body posture control device 208. The car body posture control device 208 can control the hardness/softness of the suspension and the braking on individual wheels 209, for example, according to the posture of the car body 207. Also, such posture control can be utilized in various moving objects such as a two-legged walking robot, aircraft, or helicopter. To realize the posture control, the gyro sensor 510 can be incorporated therein.

The embodiment is described above in detail. However, a person skilled in the art will readily understand that a number of modifications can be made without substantially departing from the new matters and effects of the invention. Therefore, all such modifications are considered as included in the scope of the invention. For example, a term (oscillator, gyro sensor, angular velocity or the like) that is described along with a different term with a broader meaning or the same meaning (physical quantity transducer, sensor, physical quantity or the like) at least once in the specification or drawings can be replaced with the different term at any part of the specification or drawings. Also, the configurations of the detection device, the sensor, the electronic apparatus and the moving object, and the structure or the like of the oscillator are not limited to those described in the embodiment and various modifications can be made thereto.

The entire disclosure of Japanese Patent Application No. 2013-242592, filed Nov. 25, 2013 is expressly incorporated by reference herein.

What is claimed is:

1. A detection device comprising:
   a detection circuit which carries out detection processing of a physical quantity on the basis of a signal from a physical quantity transducer and outputs detected data of the physical quantity; and
   a correction unit which carries out correction processing on the detected data and outputs the data after the correction processing as output data;
   wherein the correction unit carries out the correction processing to reduce an integration error generated in the case where the output data is subjected to integration processing, on the detected data of m bits, and outputs the output data of n bits (n and m being natural numbers, holding n<m),
   wherein the correction unit carries out integration processing of an error in the output data with respect to the detected data and carries out the correction processing on the basis of an integration result value of the integration processing.

2. The detection device according to claim 1, wherein if there is a reading request for the output data, the correction unit outputs the data after the correction processing as the output data, and carries out integration processing of an error in the output data with respect to the detected data and holds an integration result value of the integration processing.

3. The detection device according to claim 2, wherein the correction unit carries out the correction processing on the output data outputted at the time of a next reading request, on the basis of the integration result value that is held.

4. The detection device according to claim 3, wherein the correction unit carries out comparison processing between the integration result value and a predetermined value, carries out addition processing of a result value of the comparison processing to the detected data, carries out discard processing of a decimal part of the detected data after the addition processing, and outputs the output data.

5. The detection device according to claim 1, wherein
the correction unit carries out addition processing of a value obtained by multiplication processing of the integration result value by a predetermined gain, to the detected data, then carries out discard processing of a decimal part of the detected data after the addition processing, and outputs the output data.

6. The detection device according to claim 5, wherein
the correction unit carries out multiplication processing of the integration result value by the gain that is set on the basis of an input rate of the detected data and an output rate of the output data, and carries out addition processing of a value obtained by the multiplication processing, to the detected data.

7. The detection device according to claim 1, wherein
in a first mode, the data after the correction processing is outputted as the output data, and
in a second mode, the detected data on which the correction processing is not carried out is outputted as the output data.

8. The detection device according to claim 1, wherein
the physical quantity transducer is an oscillator, and
the detected data is angular velocity data.

9. A sensor comprising:
the detection device according to claim 1; and
the physical quantity transducer.

10. A sensor comprising:
the detection device according to claim 2; and
the physical quantity transducer.

11. A sensor comprising:
the detection device according to claim 3; and
the physical quantity transducer.

12. An electronic apparatus comprising the detection device according to claim 1.

13. An electronic apparatus comprising the detection device according to claim 2.

14. An electronic apparatus comprising the detection device according to claim 3.

15. A moving object comprising the detection device according to claim 1.

16. A moving object comprising the detection device according to claim 2.

17. A moving object comprising the detection device according to claim 3.

18. A detection device comprising:
a detection circuit which carries out detection processing of a physical quantity on the basis of a signal from a physical quantity transducer and outputs detected data of the physical quantity; and
a correction unit which carries out correction processing on the detected data and outputs the data after the correction processing as output data;
wherein the correction unit carries out the correction processing to reduce an integration error generated in the case where the output data is subjected to integration processing, on the detected data of m bits, and outputs the output data of n bits (n and m being natural numbers, holding n<m),
in a first mode, the data after the correction processing is outputted as the output data, and
in a second mode, the detected data on which the correction processing is not carried out is outputted as the output data.

* * * * *